Jan. 9, 1934. P. F. RUST 1,943,146
METHOD OF AND APPARATUS FOR DEODORIZING AND DEHYDRATING FLUIDS
Filed Feb. 14, 1933 2 Sheets-Sheet 1
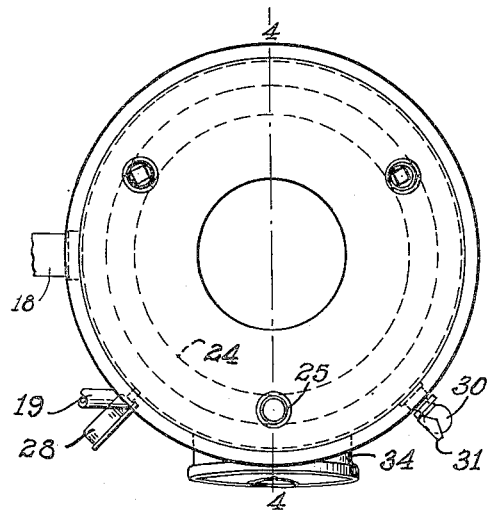
Fig.2.
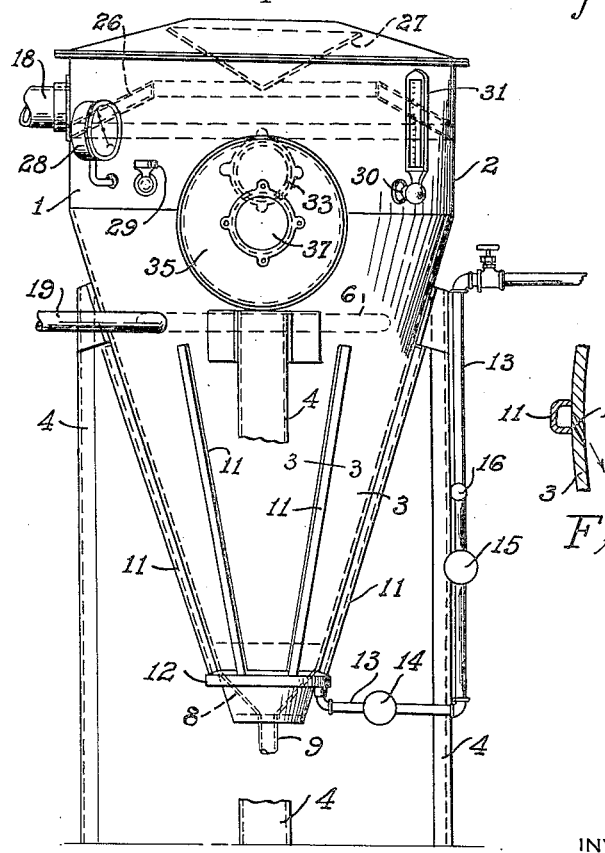
Fig.3.
Fig.1.
INVENTOR,
Philip F. Rust,
BY
Howard S. Smith,
His ATTORNEY

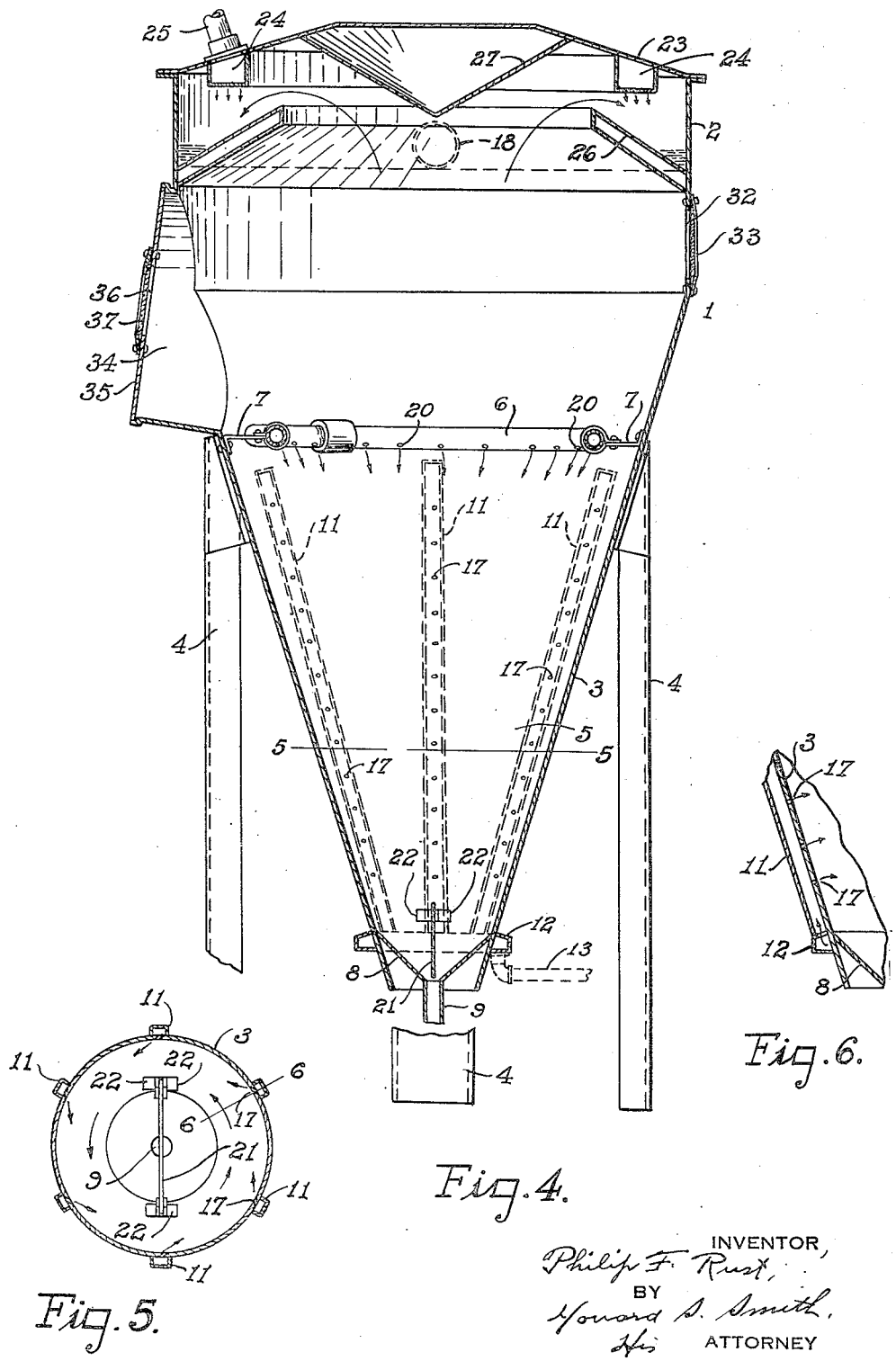

Patented Jan. 9, 1934

1,943,146

UNITED STATES PATENT OFFICE 1,943,146

METHOD OF AND APPARATUS FOR DEODORIZING AND DEHYDRATING FLUIDS

Philip F. Rust, New Bremen, Ohio, assignor of one-half to The Industrial Equipment Company, Minster, Ohio, a corporation of Ohio Application February 14, 1933. Serial No. 656,752

7 Claims. (Cl. 99—2)

This invention relates to a new and useful method of, and apparatus for, deodorizing and dehydrating fluids.

It is the principal object of my invention to deodorize and dehydrate a fluid such as cream, by steam treating it without impairing or disturbing its physical structure. This can be achieved by my process or apparatus regardless of the grade of cream, by introducing it into a vacuum chamber internally heated by steam in cyclonic action therein. In other words, the cream is discharged into an envelope or bath of steam within the vacuum chamber itself, from whence it is discharged free of deleterious odors and volatile matter.

Because cows, at certain seasons and in some sections of the country, feed upon obnoxious aromatic plants and weeds, their milk and cream have an offensive odor and flavor which make them objectionable for human consumption. For removing such odors and flavors various methods and apparatus have been employed, but so far as I am aware no one up to the present time has succeeded in thoroughly and completely deodorizing the lower grades of cream in one operation. But under my method this result is achieved by discharging the cream into a cyclonic envelope of steam within a vacuum chamber.

Under the influence of the cyclonic action of the live steam under vacuum inside the heated vacuum chamber, the temperature of the cream, or other fluid, will be practically instantaneously reduced, thereby releasing the volatile matter and washing the individual molecules of the fluid during its passage from the center to the periphery of the cyclone.

Through the centrifugal force set up by the cyclonic action of the steam, a circulation is induced to individually wash the molecules of the fluid, to continuously condense the vapors and maintain a high vacuum within the container. This vacuum is maintained at a uniform predetermined number of inches within the container, thereby controlling the boiling point of the fluid.

My method of treating liquids, such as cream, may be carried out in a vacuum apparatus including a container, in which a high vacuum is created and maintained by suitable means. On the outer wall of this container means are provided for supplying live steam at a predetermined pressure, purity and dryness, to several series of holes drilled from the base to within a predetermined distance of the top through the side wall of said container, at predetermined intervals about its circumference. These holes are thus arranged to create a cyclonic effect of the projected steam within the container, the inner wall of the latter being a surface of revolution free from axial projection.

Means are also provided to continuously feed the fluid, such as cream, into the container, where it is distributed to the top center of the whirling steam envelope. The cream after passing through steam bath descends downwardly at a predetermined angle for discharge through the bottom of the container, free of obnoxious odors, flavors and other offensive volatile matters. The condensed vapors and fixed gases from the steam-treated fluid are discharged from the top of the container.

Other important and incidental objects of my invention will be described in the following specification and particularly set forth in the subjoined claims.

In the accompanying drawings illustrating one form of apparatus for practicing my method of deodorizing and dehydrating fluids, Figure 1 is a side elevational view of the same. Figure 2 is a top plan view thereof. Figure 3 is a cross-sectional view taken on the line 3—3 of Figure 1, showing one of the inclined ports through which live steam is discharged into the vacuum chamber. Figure 4 is a longitudinal, sectional view taken through the container on the line 4—4 of Figure 2. Figure 5 is a cross-sectional view taken through the container on the line 5—5 of Figure 4, showing the cyclonic action of the steam. And Figure 6 is a longitudinal sectional view taken on the line 6—6 of Figure 5.

Referring to the drawings, the numeral 1 designates a container having a cylindrical top part 2 and a frusto-conical bottom portion 3, supported by legs 4. The lower tapering portion 3 of the container provides a treating chamber 5 to which a fluid to be deodorized or dehydrated is introduced through a perforated, tubular distributor ring 6 supported by brackets 7 attached to the inner surface of the upper portion of the chamber wall. Fitted in the lower tapering end of the container 1 is a cone 8 to the open bottom of which there is welded or otherwise secured a vertical tube 9 through which the treated fluid is discharged into a suitable receptacle.

Welded or otherwise suitably secured to the outer periphery of the treating chamber 5, and projecting longitudinally thereof, is a series of spaced channel members 11 which are distributors for live steam that is introduced into a circular head 12 which surrounds the lower part of the container to receive the bottom ends of said channel members.

Connected to the distributor head 12 is a steam line 13 which leads to a suitable source of supply, not shown. In this line 13 there is a steam trap 14 to separate water from the live steam. A conventional pressure regulator valve 15 is also placed in the steam line 13, as well as a sediment strainer 16.

Under each channel member 11 there is formed in the wall of the chamber 5, a longitudinal series of inclined orifices or ports 17 to admit steam to the interior of the chamber in a cyclonic manner, as indicated by the arrows in Figure 5. The cyclonic action of the steam within the chamber 5 is assisted by a vacuum that is created therein before its entrance, by a wet vacuum pump (not shown). This pump is placed in communication with the upper portion of the container 1 by a tube 18.

The cream, or other fluid to be deodorized, is admitted to the perforated distributor ring 6 through a cream line 19. This cream then drops through the perforations 20 in the distributor ring, into the top portion of the whirling steam envelope which is formed by the cyclonic action of the steam upon its entrance into the vacuum chamber 5. When the cream contacts this moving mass of live steam under the vacuum inside the internally heated chamber, its temperature is instantaneously reduced, thereby releasing the volatile matter. When the cream is released in the vacuum chamber, the temperature of the cream is reduced, due to the drop in pressure.

After the cream is distributed as a circular spray by the ring 6, to the top center of the live steam envelope, it passes through this cyclonic mass of live steam at a predetermined angle. From the time it contacts the top center mass of the steam until it is discharged from the tube 9 in the bottom of the container, the cream, or other liquid to be deodorized, subjects its molecules to a thorough and complete washing action, with the result that when it is discharged into a suitable receptacle, it is entirely free from objectionable odors, flavors and volatile matter.

It is thus seen that by introducing the cream, or other fluid to be deodorized, into a bath of live steam in cyclonic motion within the internally heated vacuum chamber 3, it is thoroughly deodorized and dehydrated without disturbing its physical structure, irrespective of the grade introduced.

The expansion of the steam under vacuum within the internally heated chamber 3, gives the cyclonic force desired for the washing action with the expanded steam. The discharge of the live steam into the vacuum chamber also reduces the temperature of said steam instantaneously to effect a condensation of the vapors given off. No special preliminary treatment of the cream is necessary to obtain high grade results, and the production of deodorized cream is the same regardless of its grade.

For the purpose of breaking the swirling action of the deodorized cream within the cone 8 in the bottom of the container 1, I provide a vertical baffle 21 which is positioned between clips 22, 22 attached to the inner surface of the wall forming the lower portion of the container. (See Figures 4 and 5.)

The maintenance of a high vacuum in the container 1 is assisted by the following means. The numeral 23 designates a cover secured to the top portion of the container. Welded or otherwise suitably secured to the under surface of this container is a perforated ring 24 to which cold water is admitted through a pipe 25. This water drips through the perforations of the ring 24 onto an inclined wide channel ring 26 secured to the side wall of the container.

Air within the channel ring 26 insulates the water above it from the steam chamber below, and through the mist or spray formed by the water which descends from the ring 24, the steam vapors pass. Suspended from the middle portion of the cover 23 is a conical baffle 27 which assists in deflecting these steam vapors into a path that leads through this mist or spray for condensation by it, the condensed vapors being discharged through the tube 18. The condensing means thus described assist in maintaining a uniform predetermined number of inches of vacuum, in the container, thereby controlling the boiling point of the fluid.

Secured to the upper portion of the container 1 is a vacuum regulator 28. Near this regulator there is also secured to the upper portion of the container 1 a conventional vacuum release 29. Communicating with the other side of the upper portion of the container 1 is a lateral tube 30 which supports a thermometer 31.

Immediately below the inclined ring 26 within the upper portion of the container is an opening 32 covered by a glass 33 suitably secured to the wall of the container. Adjacent this glass a light, not shown, may be held or suspended to illuminate the interior portion of the container for visibility through a manhole opening 34 in the opposite side of the container wall. This opening 34 is closed by a removable cover plate 35 through which access may be had to the interior of the casing. Formed in this cover plate is a central opening 36 over which an observation glass 37 is secured to the plate.

I do not wish to be limited to the details of construction herein shown and described, since any modifications or alterations may be made therein within the scope of the subjoined claims.

Having described my invention, I claim:

1. A method of deodorizing and dehydrating fluids continuously, which consists of introducing live steam in whirling motion into a vacuum chamber, then introducing a fluid to the top portion of the envelope of expanded steam whereby the fluid will descend outwardly and downwardly through said steam, and then discharging the treated fluid through the bottom of said vacuum chamber.

2. In a device of the type described, a container, means for creating a vacuum in the latter, means for inducing a cyclonic entrance of steam into said container, means for discharging a fluid downwardly upon the top portion of the whirling envelope of expanded steam, for treatment thereby, and means for discharging the treated fluid from the lower portion of the container.

3. In a device of the type described, a cylindrical container, means for creating a vacuum in the latter, said container formed with inclined ports in its curved side wall, means for introducing steam through said ports into the container to produce a cyclonic motion and expansion thereof, means for dicharging a fluid downwardly upon the top portion of the whirling mass of expanding steam, for treatment thereby, and means for discharging the treated fluid from the lower portion of the container.

4. In a device of the type described, a cylindrical container, means for creating a vacuum in the latter, a perforated fluid distributor ring within said container, the latter having a plurality of inclined ports in its wall below the perforated distributor ring, and means for introducing steam through said ports into the container, under vacuum, for producing a cyclonic mass of expanding steam below the distributor ring to receive and wash the molecules of the fluid which descend from it.

5. In a device of the type described, a cylindrical container, means for creating a vacuum in the latter, a perforated fluid distributor ring within the upper portion of said container, laterally spaced longitudinal channel members secured to the outer surface of the wall of said container below the distributor ring, said wall formed with a longitudinal series of inclined ports under each channel member, and means for introducing steam into said channel members for discharge through said ports into the interior of said container, said steam forming in said container a whirling mass to receive and wash the molecules of fluid which descend from the distributor ring.

6. In a device of the type described, a cylindrical container having a frusto-conical lower open end, means for creating a vacuum in the latter, a perforated fluid distributor ring in the upper portion of said container, a steam receiving head surrounding the lower end of said container, channel members projecting upwardly from said head along the outer surface of the conical wall of said container, said wall formed with a longitudinal series of inclined ports under each channel member to project steam into the container, under vacuum, in a cyclonic manner to wash the molecules of fluid which descend through it from the perforated distributor ring, and means for discharging the treated fluid from the bottom of said container.

7. In a device of the type described, a container, means for creating a vacuum in the latter, means for inducing a cyclonic entrance of steam into said container, means for discharging a fluid downwardly upon the top portion of the whirling envelope of expanded steam, means for discharging the treated fluid from the bottom of said container, and a baffle in the lower portion of said container to stop the whirling motion of said fluid before it is discharged.

PHILIP F. RUST.